United States Patent [19]
Hekker

[11] Patent Number: 5,450,378
[45] Date of Patent: Sep. 12, 1995

[54] HOLOGRAPHIC ELEMENTS FOR AN OPTICAL RECORDING SYSTEM

[76] Inventor: Roeland M. T. Hekker, 608 W. Fillmore Ave., Fairfield, Iowa 52556

[21] Appl. No.: 154,580

[22] Filed: Nov. 8, 1993

Related U.S. Application Data

[63] Continuation of Ser. No. 782,960, Oct. 25, 1991, abandoned.

[51] Int. Cl.⁶ ............................................. G02B 5/30
[52] U.S. Cl. ................................. 369/102; 369/44.12; 369/44.23; 359/15
[58] Field of Search ................... 369/103, 112, 44.12, 369/44.23; 359/15, 16, 19

[56] References Cited

U.S. PATENT DOCUMENTS

| | | | |
|---|---|---|---|
| 3,632,182 | 1/1972 | Sincerbox | 359/10 |
| 3,794,426 | 2/1974 | Mueller et al. | 350/3.5 |
| 3,899,240 | 8/1975 | Gabor | 359/10 |
| 4,173,474 | 11/1979 | Tanaka et al. | 430/1 |
| 4,458,980 | 7/1984 | Ohki et al. | 3560/3.73 |
| 4,497,534 | 2/1985 | Sincerbox | 359/19 |
| 4,502,762 | 3/1985 | Anderson | 350/394 |
| 4,525,625 | 6/1985 | Abe | 250/201 |
| 4,550,973 | 11/1985 | Hufnagel | 350/3.72 |
| 4,626,679 | 12/1986 | Kuwayama et al. | 250/227 |
| 4,731,772 | 3/1988 | Lee | 369/45 |
| 4,735,486 | 4/1988 | Leib | 350/162.13 |
| 4,776,652 | 10/1988 | Ih | 350/3.72 |
| 4,832,464 | 5/1989 | Kato et al. | 350/3.72 |
| 4,834,474 | 5/1989 | George et al. | 340/3.65 |
| 4,838,630 | 6/1989 | Jannson et al. | 350/3.7 |
| 4,850,662 | 7/1989 | Chen | 350/3.72 |
| 4,879,709 | 11/1989 | Clark | 369/284 |
| 4,907,847 | 3/1990 | Onayama et al. | 350/3.23 |
| 5,121,231 | 6/1992 | Jenkins et al. | 359/10 |
| 5,272,550 | 12/1993 | Dickson et al. | 369/103 |

FOREIGN PATENT DOCUMENTS 2121139 10/1988 Japan .................................. 369/103

OTHER PUBLICATIONS

Advertising Materials, Physical Optics Corporation, "Holographic Optical Elements" (Undated).
Unknown Author, "What is a Holographic Optical Element," Dec. 14, 1989.
Arnold, "Computers Simplify Holographic Lens Design Processes," *Industrial Research and Development*, Sep. 1989.
Jannson et al., "Solar Control Tunable Lippman Holowindows," *Solar Energy Material* (1986) 14:289.
Moslehi et al., "Fiber Optic Wavelength-Division Multiplexing and Demultiplexing Using Volume Holographic Gratings," *Optics Letters*, 14:19, p. 1088 (1989).
Marchant, "Optical Recording," Chapters 7 and 8 (1990).
Nakano et al., "Optical head controlled by Double Diffraction Patterns," *Jap. J. Appl. Phys.* (1987) 26-4, 249.
Ura, et al., "An Integrated Optical Disc Pickup Device," *Trans. of the IECE of Japan*, J39-C 609 (1986).
Goto et al., "Spherical Grating Objective Lenses and Application for the Optical Disc Pickups," *Jap. J. Appl. Phys.*, 26-4, 135 (1987).
Suhara, et al., "An Integrated Optic Disc Pickup Device," IOOC-ECOC p. 117 (1985).

*Primary Examiner*—Paul M. Dzierzynski
*Assistant Examiner*—Kiet T. Nguyen
*Attorney, Agent, or Firm*—Brandi W. Sarfatis

[57] ABSTRACT

An optical recording, erasing and playback system. One or more functions in a conventional optical disc system are performed by one or more holographic optical elements (HOE). Exemplary of the functions performed by the HOE are collimation, beam shaping, combining of beams, and focusing. According to preferred embodiments, volume HOEs are utilized.

19 Claims, 12 Drawing Sheets

HOLOGRAPHIC ELEMENTS FOR AN OPTICAL RECORDING SYSTEM

This is a continuation of application(s) Ser. No. 07/782,960 filed on Oct. 25, 1991 now abandoned.

BACKGROUND OF THE INVENTION

The present invention relates to the field of optical recording systems and their use. More specifically, in one embodiment the invention provides a variety of improved optical recording heads for an optical disc player and/or recorder using holographic optical elements.

Read only, erasable, and write-once/read-many (WORM) optical recording media and systems are well known to those of skill in the art. Such media are usually provided in the form of discs ("CD's") and may be used for storage of large amounts of data in a wide variety of applications such as data storage (in computer systems), audio storage, or video storage. The discs with which most consumers are currently familiar are optical read-only discs used in audio applications. These discs have a reflective surface containing pits which represent audio data in binary form. A detailed description of these pits and how they function is provided by Watkinson, "The Art of Digital Audio," Focal Press, Chapters 13 et al., which is incorporated by reference herein for all purposes.

The standard compact disc player generally operates by focusing a laser beam on the reflective metal through the substrate and then detecting reflected light. The pits increase the optical path of the laser beam by an amount equivalent to a half wavelength, thereby producing destructive interference when combined with other (non-shifted) beams. The presence of data thus takes the form of a drop in intensity of the reflected light. The detection system on a standard player is thus designed to require greater than 70% reflection when no destructive interference occurs and an amplitude less than 30% when data are present. These intensity limits, combined with the focusing parameters, set the criteria for the compact discs and other optical data storage media which can be read or played on such players.

Media on which data can be recorded directly and read directly from have a different configuration and operate under a somewhat different principle. One example is described in U.S. Pat. No. 4,719,615 (Feyrer et al.), which is incorporated herein by reference for all purposes. The medium disclosed in Feyrer et al. includes a lower expansion layer of a rubbery material which expands when heated. The expansion layer is coupled to an upper retention layer which is glassy at ambient temperature and becomes rubbery when heated. Both layers are supported on a rigid substrate. The expansion and retention layers contain dyes for absorption of light at different wavelengths. Data are recorded by heating the expansion layer by absorption of light from a laser beam at a "record" wavelength to cause the expansion layer to expand away from the substrate and form a protrusion or "bump" extending into the retention layer. While this is occurring, the retention layer rises in temperature above its glass transition temperature so that it can deform to accommodate the bump. The beam is then turned off and the retention layer cools quickly to its glassy state before the bump levels out, thereby fixing the bump.

Reading or playback of the data is then achieved by a low intensity "read" beam which is focused on the partially reflecting interface between the retention layer and air. When the read beam encounters the bump, some of the reflected light is scattered, while other portions of the reflected light destructively interfere with reflected light from non-bump areas. The resulting drop in intensity is registered by the detector. Removal of the bump to erase the data is achieved by a second laser beam at an "erase" wavelength which is absorbed by the retention layer and not the expansion layer. This beam heats the retention layer alone to a rubbery state where its viscoelastic forces and those of the expansion layer return it to its original flat configuration. The write, read and erase beams all enter the medium on the retention layer side, passing through the retention layer before reaching the expansion layer.

A variety of improved optical recording systems and media have been devised. Certain of these improved recording systems and media are disclosed in, for example, U.S. Pat. No. 4,879,709 and U.S. application Ser. No. 294,723, both of which are assigned to the assignee of the present invention and incorporated herein by reference for all purposes.

A large number of optical head designs have been introduced in the last few years to serve the needs of the compact disc, optical data storage and video disc market. Each market has its own characteristic requirements. The emphasis in the CD market, for example, is low piece price. Low piece price is often realized by minimizing the number of components at the expense of the lightpath efficiency. Although cost is still an important consideration for optical data storage applications, a high efficiency light path is even more important. Optical heads for video disc applications have been somewhat constrained in their development because of the lack of short wavelength laserdiodes. However, with the growing availability of short wavelength laserdiodes one can expect a revived interest in this area of optical head design.

Conventional optical components made out of glass tend to be expensive because they are made in batches, and human intervention during the manufacturing process can hardly be avoided. One way to solve this problem is application of injection molded lenses. Although molded lenses can be manufactured at very low cost, their mechanical and optical properties are in general of less quality than their comparable glass counterparts. They have been used in some optical heads for CD's but have been avoided in applications where recording of media is required. Another alternative is the application of Holographic Optical Elements (HOE). Previous HOE applications generally have low efficiency and are, therefore, used primarily for CD applications. Previous HOEs tended to act only as a complex grating; they diffract the light but do little else. Many of the holograms used in prior HOEs were computer generated holograms and are implemented as surface holograms. This type of hologram tends to be inefficient and not desirable for optical read/write heads. Furthermore, a single hologram generally performs a single function in the case of surface holograms.

From the above it is seen that an improved optical media recording/reading system and method of recording data on and reading data from optical data storage media are desired.

SUMMARY OF THE INVENTION

An improved optical recording and reading system is disclosed, along with a method of recording data on and reading data from an optical storage media. The optical recording/reading system makes use of holographic optical elements (HOEs) in the place of selected conventional mirrors, lenses, beam splitters, and/or other optical elements used in the optical portion of a compact disc player and recorder. Such HOEs are fabricated more economically than conventional optical elements, reduce the number of optical elements needed in a compact disc unit, and/or provide improved performance over conventional optical systems.

In one embodiment, high efficiency HOEs are utilized which are recorded optically. In some embodiments HOEs which are optically recorded are used to perform multiple functions such as focusing and collimation.

The most common form of volume hologram includes a suitable substrate on which a thick (1 to 4 μm and in most cases several times the wavelength of light to be used) layer of light sensitive material is deposited.

Volume holograms are utilized according to one embodiment. By "volume holograms" it is intended to mean herein a device in which information is stored in a three dimensional form inside suitable media.

Accordingly, in one embodiment the invention comprises apparatus for controlling at least one beam of light in an optical data storage system. The apparatus includes a light source; a volume holographic optical element in a raypath of light from the light source, the holographic optical element adapted to perform a function selected from the group of focusing, collimation, beam shaping, wavefront correction, and combining at least two beams; and means for moving optical data storage media in said raypath.

A further understanding of the nature and advantages of the inventions herein may be realized by reference to the remaining portions of the specification and the attached drawings.

DESCRIPTION OF THE PREFERRED EMBODIMENTS

CONTENTS

I. General
II. HOE System Configuration
   A. Collimation and Beam Shaping
   B. Collimation and Focusing
   C. Servo Signal Generation
   D. Composite Systems
III. Volume HOE Fabrication
IV. Focus Technique
V. Inverse Gaussian Filter

I. General

In general, an optical system for an optical data storage system disc will contain one or more of the following:

a laser source;

beam shaping optics which shape the beam emitted by the laser source;

optics which separate the laserbeam going to the optical disc and the return beam reflected by the disc;

a single or compound lens to focus the laser beam to a tiny spot on the disc;

lenses and prisms to derive the focus and tracking signal from the return beam; and light sensitive devices for detection of the return beam.

Figure 1:
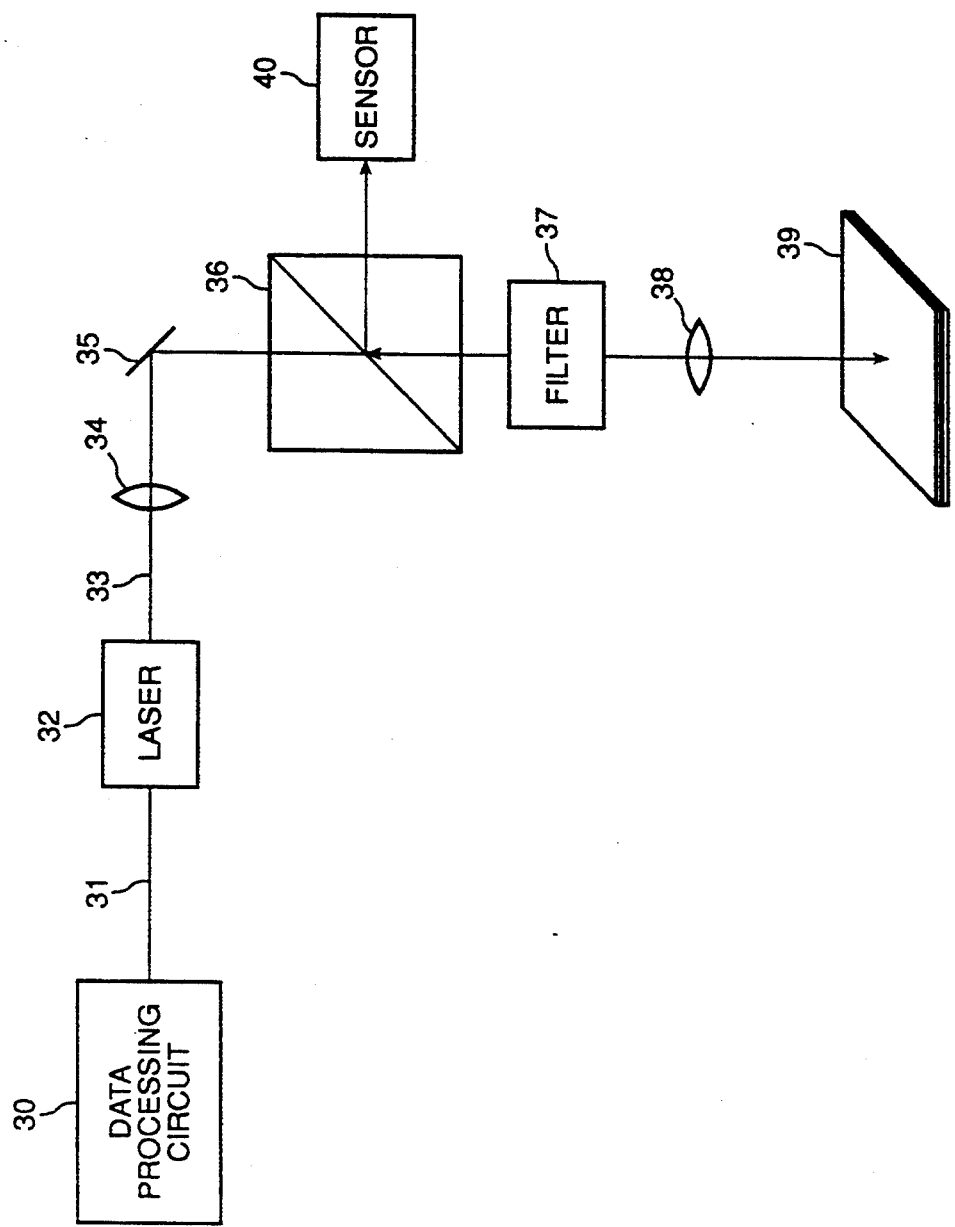
FIG. 1 is an overall block diagram of a known optical recording and playback system utilizing erasable media.

FIG. 1 illustrates one example of an electrooptical system using conventional optics for recording data on an erasable or WORM data storage medium. It is to be understood that FIG. 1 is provided as an illustration of the application of the inventions herein, other exemplary applications include optical tape or optical cards.

The recording system includes a digital data processing circuit 30 whose output on line 31 controls pulsed variable-intensity laser 32. The laser beam 33 emerging from the laser 32 is collimated by a lens 34 and then reflected by a mirror 35. The reflected beam from the mirror is propagated through a beam splitter 36.

The laser beam emerging from the beam splitter 36 is passed through a quarter-wavelength plate 37, and then propagated through an objective lens 38 which focuses the laser beams on the moving optical data storage medium 39. Light reflected back from the medium 39 is collected by the lens 38 and propagated through the element 37 to the beam splitter 36, which propagates the reflected light to a light sensor(s) 40.

The laser 32 is preferably a high-power laser (2-15 mW at the media surface) and is either continuous or pulsed. The wavelength of the laser beam 33 is the wavelength referred to herein as the "write" or "record" wavelength. The write beam enters the medium at the substrate side of the optical recording medium and passes through the transparent substrate into an expansion layer, which is adjacent a retention layer. The expansion layer, which is absorptive of light at the laser wavelength, rises in temperature due to the absorption, but is kept from localized expansion in one direction by the rigid substrate. Expansion pressure thus builds up and the retention layer begins to deform in a broad manner. Meanwhile, the temperature of the retention layer rises by conduction from the expansion layer, and possibly by light absorption as well. As the temperature of the retention layer increases, it approaches the glass transition temperature and a small weak area is formed around the axis of the incident beam. The expansion layer then flows into this weak area allowing expansion to be localized and thereby creating a well-defined bulge or bump. The retention layer deforms accordingly to follow the contour of the bulge, and protrude into the reflective and/or protective layer. When the laser is turned off, the various layers cool. The reflective layer acts as a heat sink rapidly drawing heat away from the retention layer, and the retention layer cools down below its glass transition temperature, increasing its shear modulus to lock in the deformation while the expansion layer is still in its expanded state.

Erasure is achieved by using a laser beam of a different wavelength, one which is absorbed primarily by the retention layer. The expansion layer may also be absorptive at this wavelength to some degree provided that the resulting temperature increase in the expansion layer is not great enough to record a mark. Absorption of the light from this beam by the retention layer will raise it to its rubbery state, at which point elastic forces in the expansion layer as well as the viscoelastic properties in the retention layer will draw the retention layer back to its original configuration.

Figure 2:
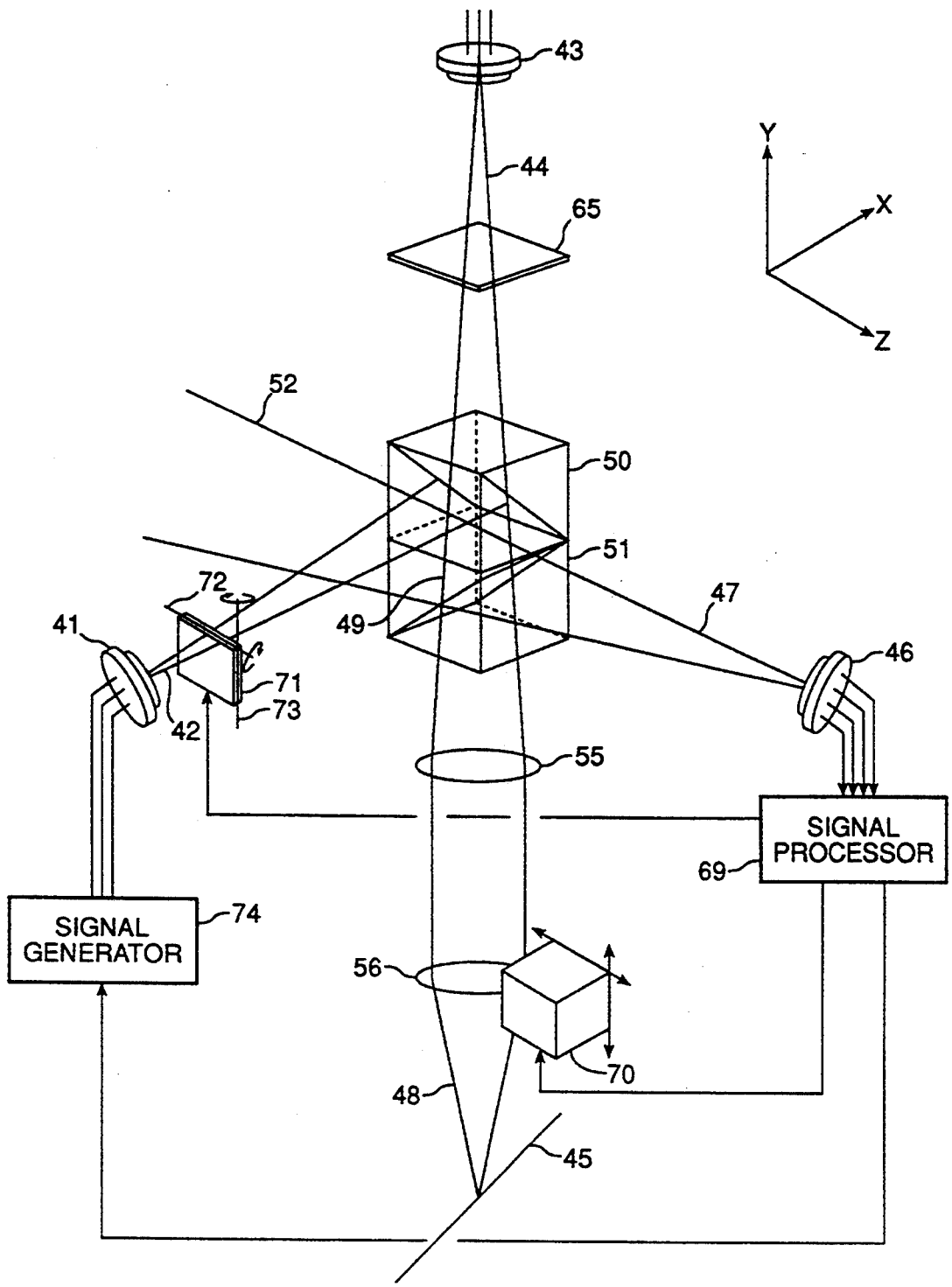
FIG. 2 is a more detailed view of a conventional optical recording and playback system.

More detail regarding an electro-optical system using conventional optics is shown in FIG. 2. A write beam diode 41 and a read beam diode 43 are both directed at a highly polarizing beam splitter 50. The write beam diode 41 is rotated so that the emerging write beam 42 is S-polarized with respect to the beam splitter 50, while the read beam diode 43 is rotated so that the emerging read beam 44 is P-polarized with respect to the beam splitter 50. The beam splitter 50 is itself arranged so that it reflects a high proportion of the write beam 42 downward along the y axis while transmitting a high proportion of the read beam 44, with the result that the reflected write beam and the transmitted read beam are parallel, preferably coaxial, forming a combined beam 48 directed toward the recording medium 45. The highly polarizing beam splitter 50 preferably reflects at least about 90% of the write beam 42 and transmits at least about 90% of the read beam, with about 95-98% preferred for both polarization directions.

A second beam splitter 51, less polarizing than the first, is situated in the path of the combined beam 49 emerging from the first beam splitter. The second beam splitter 51 is rotated 90° with respect to the first beam splitter 50, with the result that any light reflected from the y axis is directed along with the z axis. Also due to the change of direction, the second beam splitter 51 causes reflection of light from the read beam 44 transmitted through the first beam splitter 50. Since the second beam splitter 51 is less polarizing than the first, however, it transmits preferably from about 10% to about 50% of the light from the read beam, reflecting substantially the remainder. In a convenient arrangement, 80% of the read beam is reflected along the z axis to loss 52, and 20% is transmitted along the y axis toward the recording medium. For light polarized in accordance with the write beam 42, however, it is preferred that at least about 80% be transmitted down along the y axis toward the recording medium, with the rest reflected to loss 52, exclusive of the amount absorbed. Convenient values for the write beam are 88% transmission and 10% reflection.

A collimating lens 55 and an objective lens 56 focus the combined beam 48 on the recording medium 45, particularly the reflecting surface therein. The reflecting surface reflects the light, less any light which has been absorbed by the medium, back along the same axis, superimposed over the incident combined beam 48, toward the second beam splitter 51. The component of the reflected beam originating from the read beam 44, due to its polarization, is partially reflected and partially transmitted as before, with the same percentages. The reflected beam 47, however, is directed along the z axis toward the photodetector 46. In the specific example given above, 80% of the read beam reflected from the recording medium will thus be directed toward the photodetector. A component of the write beam 42 will also be present in the beam reflected from the recording medium, although small. The majority of this beam will be transmitted through the beam splitter 51 as before, with the small reflected portion (about 10% in the specific example) being reflected toward the photodetector.

The write beam 42 will be of a sufficient intensity to cause a recording response in the medium. The read beam 44 will generally be of lesser intensity. An advantage of this arrangement is that a relatively small proportion of the write beam reaches the photodetector 46. This proportion may be reduced even further by the placement of an appropriate filter in the beam path.

A diffraction grating 65 is placed in the path of the read beam 44 to split the beam into three separate beams—a central beam and two side beams which may be used for tracking. The central beam is centered on the signal track, coincident with the write beam, to monitor the signals being recorded and to check for previously recorded signals which have not been completely erased. The side beams are positioned to fall partly on the signal track and partly off to either side. The reflections from the side beams are received by photoelectric detectors, and a differential amplifier produces a signal representative of the relative intensities and thus the relative degree of overlap of the side beams with the signal track. A tracking servo driven by the amplifier moves the objective lens 56 to correct for lateral drift and thereby ensure that the central beam is appropriately focused to the center of the signal tack. Signals reflected from the central beam may be used for a variety of control functions, including vertical focusing control along the y axis, and comparison of the recorded data as it is being emitted at the write diode 41. Thus, signals from the photodetector 46 will be processed by a signal processor 69 whose output controls various adjustment devices in the system, including a servo 70 controlling the position of the objective lens 56 along two directions by appropriate rotation around either of the two axes shown, a beam shifting device 71, shown here as a block of refracting medium capable of parallel shifting of the write beam 42 along either of two orthogonal directions by rotation around orthogonal axes 72, 73, and the signal generator 74 which provides the pulsing sequence for the write laserdiode 41 to provide the latter with an appropriately modulated output to produce the binary data required for the optical storage medium.

II. HOE System Configuration

According to a preferred embodiment of the invention herein, one or more of the functions of conventional optical elements is performed by a volume holographic optical element (HOE). As used herein, a volume HOE is intended to mean a device which includes a substantially transparent substrate containing a 3-dimensional interference pattern representing a diffraction grating in the volume of the substrate (a "volume hologram"). In preferred embodiments, the volume HOEs are manufactured by, for example, simultaneously exposing film to light from a coherent source and to light reflected from an object or lens illuminated by the same source. Alternatively, such HOEs may be manufactured through the use of a computer program used to solve the mathematical expression of a stationary interference pattern as described in, for example, *Industrial Research and Development*, September 1983, pgs. 110–113, which is incorporated herein by reference for all purposes. HOEs may be designed to perform any one of a variety of functions including beam shaping, collimation, focusing, splitting, deflection, or correction, as well as multiple junctions.

A. Collimation and Beam Shaping

Laserdiodes are now widely used in optical disc applications. Compared to gas lasers and other solid state lasers they are energy efficient, small, and low cost. However, the beam of radiation emitted by the laserdiode is divergent, elliptical in shape, and exhibits astigmatism. Astigmatism manifests itself most clearly when focusing an astigmatic laserbeam to a small spot. In doing so, the laserbeam focuses down to a line just in front of the focal plane of the lens, while it also focuses to a line just behind the focal plane. A number of products have appeared on the market place to overcome these shortcomings such as laserpens manufactured by companies like Philips, Telefunken, Rodenstock, Melles and Griot. To make the laserbeam parallel, prior devices have used a collimation lens to make the beam parallel. In most cases this lens is a compound lens, i.e., a lens made out of several lenses or one aspheric lens. In order to correct the elliptical nature of the beam, prior devices use only the center part of the beam or use one or two prisms to magnify or shrink the beam in one direction. A less popular method is the usage of an anamorphic telescopic lens system. For a certain class of laserdiodes, astigmatism can be ignored. For other classes of laserdiodes the amount of astigmatism is sufficiently large that it can be compensated using cylinder lenses.

The present invention uses holographic techniques to overcome many of the shortcomings of laserdiodes. More specifically, the invention uses volume optical holography in preferred embodiments. In some embodiments, selected functions are performed by computer-generated holograms in which the "interference pattern" that will generate the desired function is calculated on a computer and the pattern is then etched in a photo-resist layer. In computer generated "surface holograms, information will be contained in the form of ridges and valleys, while in "amplitude" holograms information will be contained in the form of an opaque mask in which certain portions have been removed or etched away.

To generate a hologram optically, the interference pattern of two or more laserbeams is recorded on a holographic plate. A holographic plate consists of a substrate and a light-sensitive layer. The interference pattern can either be stored as a spatial variation in the transmission or reflection, also called amplitude hologram, or as a variation in the optical path length of the sensitive layer, also called a phase hologram. Variation in the optical path length can be implemented either by local variations in the thickness of the sensitive layer (surface holograms) or by local variations in the index of refraction of the sensitive layer. Depending on how the hologram is exposed a surface hologram or a volume hologram can be made. In the latter, the interference pattern is a three-dimensional pattern inside the sensitive layer. Volume holograms using variations in the index of refraction can have efficiencies up to 100%, while surface holograms using variations in transmission or reflection tend to be quite inefficient and, therefore, volume holograms are preferred. After development of the holographic plate, the original laserbeams can be regenerated by exposing the hologram with the properly selected read-out beam. Each beam used in the recording process can reconstruct the other recording beams.

To collimate a divergent beam with a holographic optical element, a laserdiode beam is made to interfere with a collimated beam at a holographic plate. The holographic plate is developed, forming a hologram. If this hologram is now exposed to the laserdiode, a beam will emerge from the hologram with the same properties as the original collimated beam except that it emerges from the other side of the plate, while it propagates in the same direction as the original collimated beam. In the same way the aspect ratio or astigmatism is corrected.

Several laserbeams can be used during the recording. This principle can be used to combine laserbeams from two laserdiodes to one collimated beam. During the recording of the holographic plate the divergent beams of two or more laserdiodes are interfering with the same number of co-linear collimated laserbeams. If the hologram is read out with the same laserdiodes, the co-linear collimated laserbeams are automatically reconstructed. The wavelengths of the laserdiodes do not have to be identical.

Figure 3:
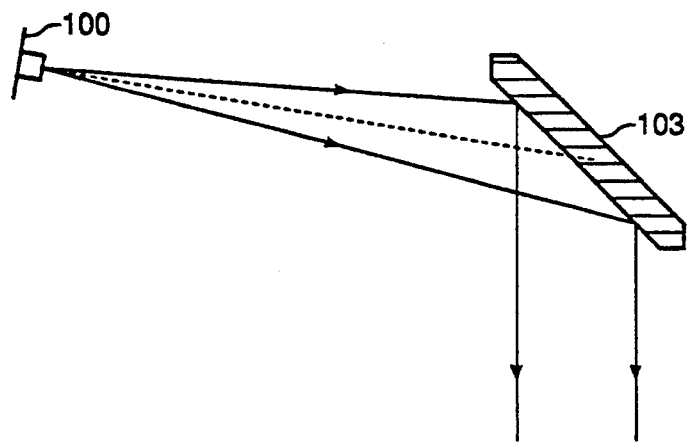
FIG. 3 is an illustration of a collimation device according to one embodiment of the invention.

FIG. 3 illustrates an HOE as it is used to collimate a beam from a laserdiode in an optical disc system. A laserdiode 100 generates a non-collimated beam which is directed at a hologram 103. The beam emerging from the hologram is fully collimated and may be used in a variety of applications such as reading from an optical disc, writing on an optical disc, erasing data from an optical disc, tracking, or the like.

B. Collimation and Focusing

Figure 4:
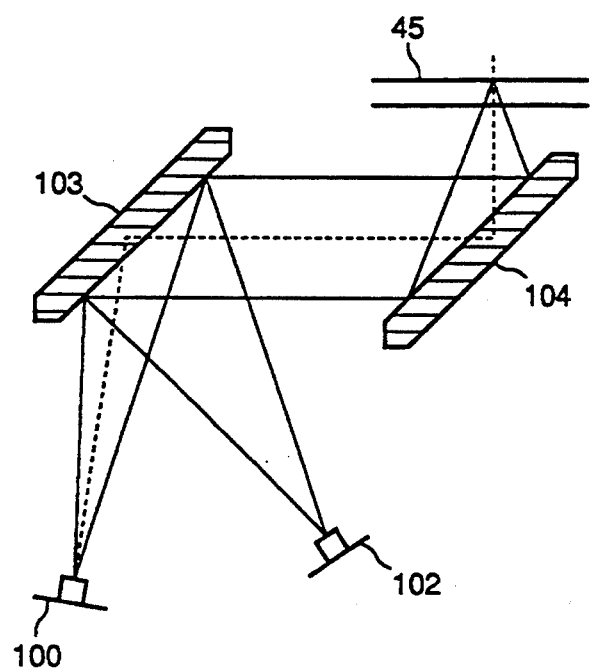
FIG. 4 is an illustration of a first alternative embodiment of the invention in which collimation and focusing of beams from two laserdiodes is performed.

FIG. 4 is an overall block diagram of a system for reading data from an optical disc according to another embodiment of the invention herein. While the system shown for illustration in FIG. 4 is used for reading data from an optical data storage disc 45, it will be apparent to those of skill in the art that the inventions herein could also be applied to write and erase beams in erasable CD applications. The system includes commercially available laserdiode 100 for generation of read beam for reading from the optical disc. The system also includes a commercially available photodiode 102 used for detection of a returned signal from the disc for tracking, focusing, and for data signal detection.

A first HOE 103 is placed in the lightpath of both the laserdiode 100 and serves to collimate the divergent beam produced by the laserdiode and alter the aspect ratio of the beam into a circular shape. In addition, HOE 103 may serve to perform wavefront correction of radiation emitted from the laserdiode.

The collimated beam from the HOE 103 is directed at a second HOE 104 which is used as an objective lens for the beam. Light is reflected from the disc 45 and modulated to a high or low return level depending upon the presence or absence of a data bump, as has been discussed in greater detail above. Light reflected from the HOE 104 is then directed at the HOE 103 and returned to the photodiode for conversion to an electrical signal, which is processed in accord with conventional means.

In addition to the data detection function, the HOEs 103 and 104 may also be used for formation of and detection of two or three spots used for generation of a tracking signal. The two-spot tracking method is described in greater detail in Watkinson, previously incorporated herein by reference.

Figure 5:
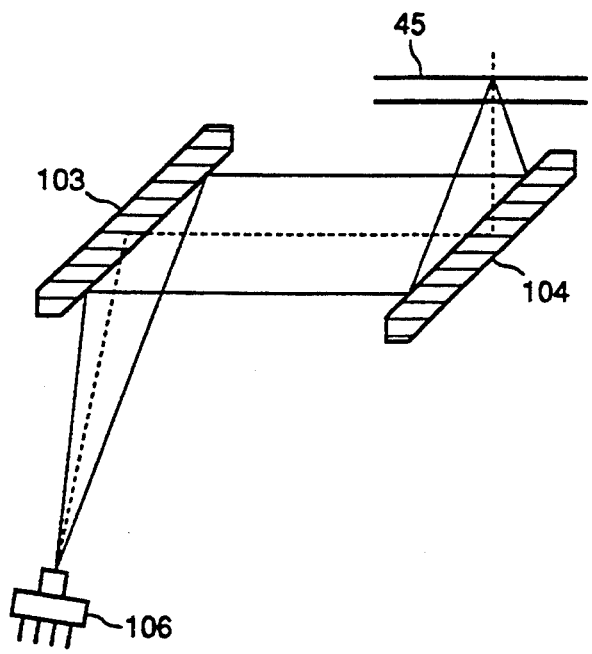
FIG. 5 is an illustration of an alternative optical data reading mechanism using a single laserdiode.

FIG. 5 illustrates an alternative embodiment of the invention. According to this embodiment, the laserdiode and the photodiode are housed in a single housing 106. The laserdiode/photodiode assembly may be manufactured by from commercially available laser diodes and photodiodes. Again, two HOEs are utilized. The first HOE 103 is used for beam shaping and collimation for the forward-going beam, as well as to generate a focus error signal and a tracking signal from the return beam. The second HOE is used for focusing of the beam(s) on the disc 45 and for generating two additional beams for use in a two-spot tracking method. However, in this second embodiment the HOEs differ from the first embodiment in that the return beam is refocused in the housing 106 for data detection by the photodiode.

Figure 6:
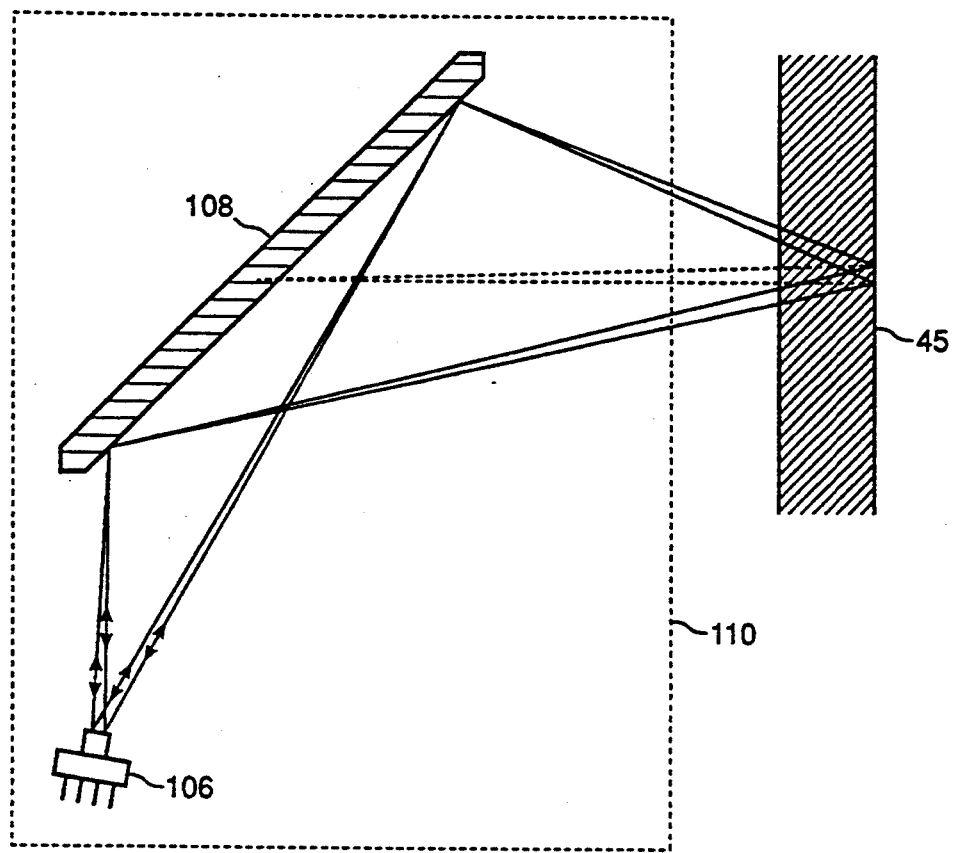
FIG. 6 illustrates the use of an HOE used to perform both collimation and focusing.

FIG. 6 illustrates another alternative embodiment of the invention. This embodiment uses a single multifunction volume hologram HOE 108 which serves to take an un-collimated beam from the combined laserdiode/photodiode 106 and focus the beam on the optical disc 45 directly. In addition, the reflected beam from the disc is re-focused in the laserdiode/photodiode 106 for data gathering. Of course, the simplicity of this arrangement provides the ability to house the entire assembly in a housing 110 which can move in both the focus and lateral directions with respect to the disc.

C. Servo Signal Generation

Figure 7:
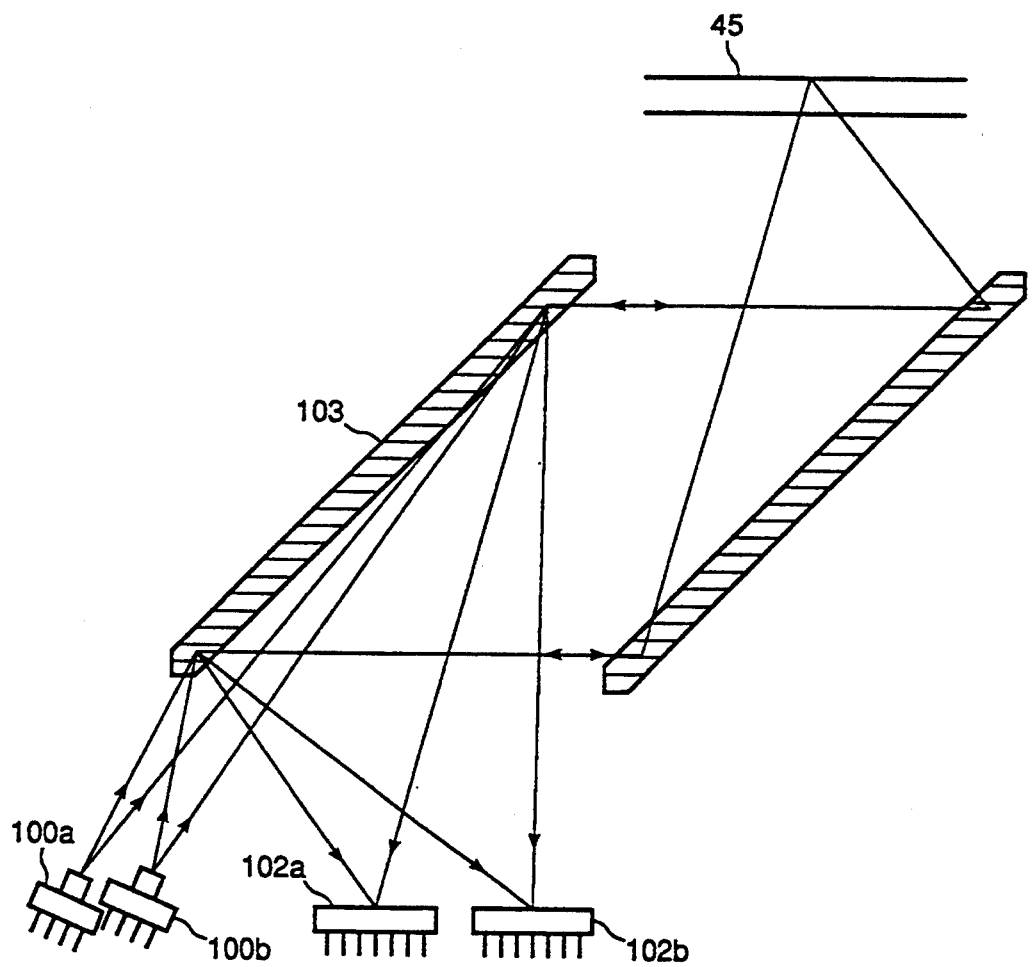
FIG. 7 is an illustration of an alternative embodiment of the invention in which two laserdiodes are utilized in conjunction with two photodiodes.

FIG. 7 illustrates another embodiment of the present invention. According to this embodiment, the invention includes first and second laserdiodes 100a and 100b, as well as first and second photodiodes 102a and 102b. Two beams are provided, for example, for writing and erasing on the disc. HOE 103 combines, collimates and beam shapes the two beams. Upon return it splits the two beams and does the required beam manipulation necessary for servo signal generation. Of course, as with the embodiment shown in FIG. 5, the two laserdiodes, the two photodiodes, or the two laserdiodes and the two photodiodes could be combined into a single head.

Similarly, as shown in FIG. 5, all of the functions of both the holograms could be combined into a single volume hologram.

D. Composite Systems

Figure 8:
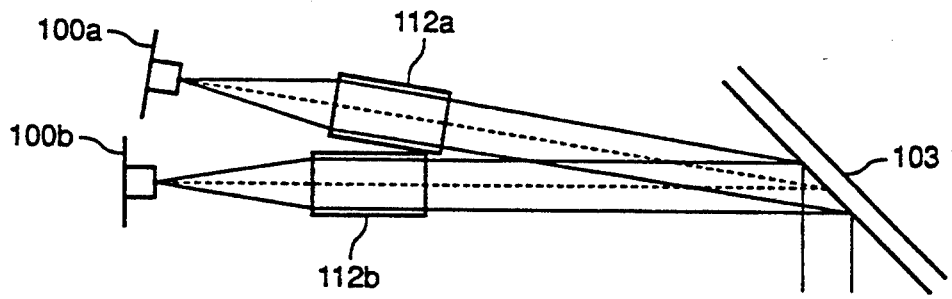
FIG. 8 is an illustration of a composite system using both conventional and HOE optical elements.

FIG. 8 illustrates an alternative embodiment of the invention which combines HOEs and conventional optical components. In the embodiment shown in FIG. 8, conventional collimation objectives 112a and 112b are used for collimation of the cones of radiation emitted by the laserdiodes 100a and 100b. The two beams are then combined with HOE 103. Of course, as in the above embodiments, HOE 103 may also perform wavefront or aspect ratio correction.

Figure 9:
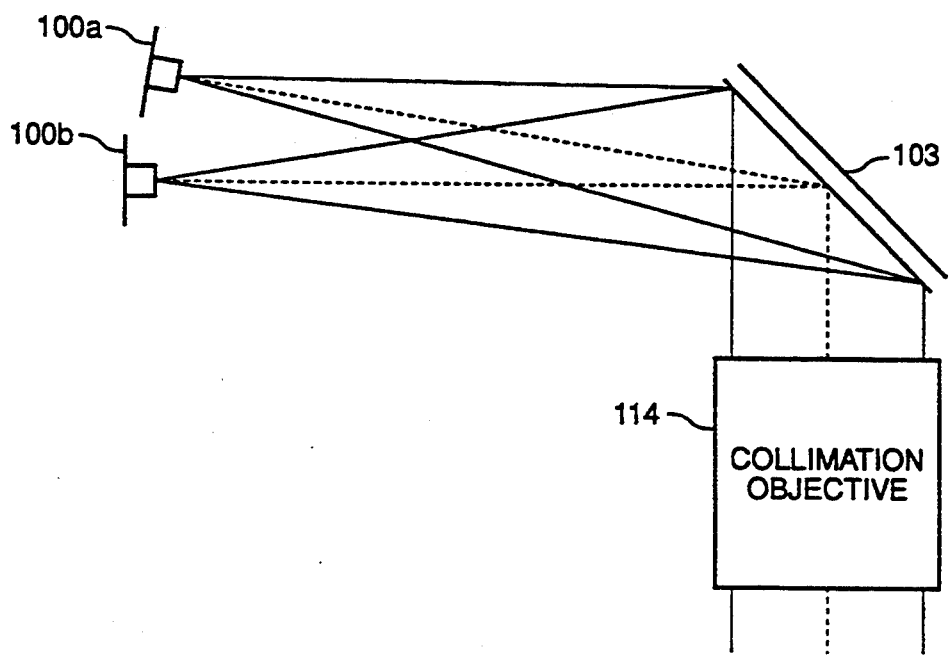
FIG. 9 is an alternative embodiment of a composite system.

FIG. 9 illustrates an alternative embodiment of the system shown in FIG. 8. According to the embodiment of FIG. 9, the HOE 103 first performs the function of combining the two divergent beams from laserdiodes 100a and 100b. The two co-linear beams from the HOE 103 are then collimated by a single collimation objective 114.

III. Volume HOE Fabrication

The HOEs used herein are fabricated through the use of optical components which would provide the desired function such as collimation, focusing, or the like. These components may, however, be of much higher quality than the components which would normally be used in a commercial player. These components are used to fabricate an appropriate HOE which is then used in the player and "plays back" the desired function.

Many or all of the functions of conventional optical elements in an optical system may be performed by HOEs according to the inventions herein. Examples of the fabrication of HOEs are provided below.

Figure 10A:
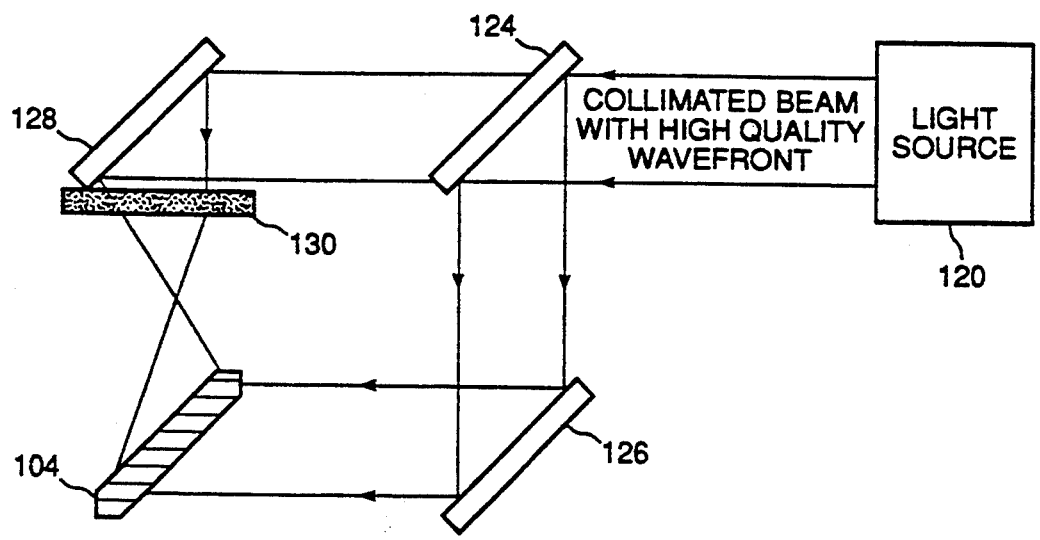
FIGS. 10a and 10b illustrate apparatus for forming a volume hologram according to one embodiment of the invention for collimation.
Figure 10B:
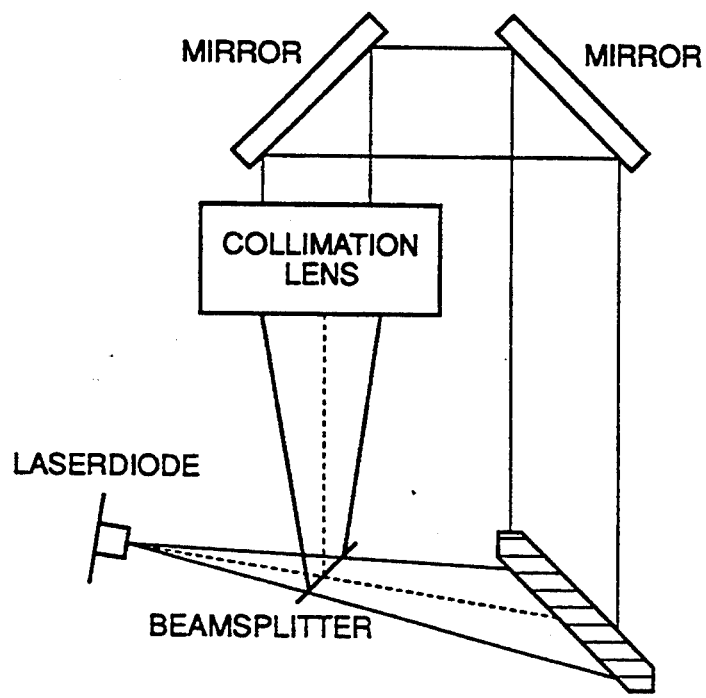

In the embodiment shown in FIG. 4, the read-out HOE 104, focuses the incoming beam to a spot on the disc. FIG. 10a illustrates a method/apparatus for forming the HOE 104. A collimated light beam derived from a suitable light source 120, enters from the right side of the drawing. This beam is split by the beamsplitter 124, into two beams. One of the beams exposes a previously unexposed holographic plate 104 directly via a mirror 126, while the other beam is reflected by mirror 128 and focused by a high quality lens 130 before it impinges on the holographic plate 104. After development by means well known to those of skill in the art, the holographic plate is "read back" with a collimated reference beam. The beam emerging from the HOE is focused with the same numerical aperture (or F-number) as the focused beam produced by the lens 130. Unexposed holographic plates suitable for this purpose may be obtained from various sources. FIG. 10b illustrates a similar apparatus for fabricating an HOE which performs a collimation function using a laserdiode and a high quality collimation lens 131.

Figure 11A:
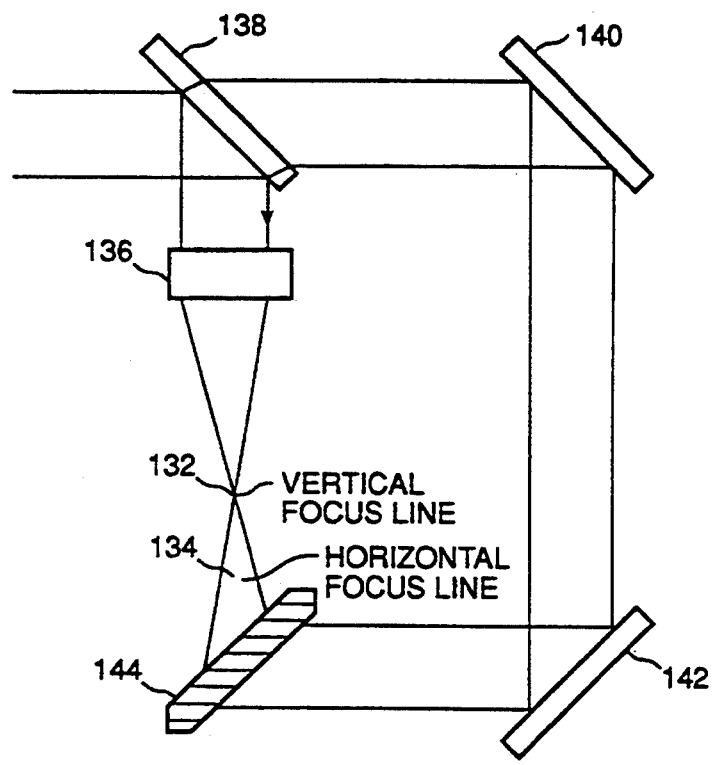
FIGS. 11a and 11b illustrate formation of a volume HOE used for generation of a focus signal according to the astigmatic method and use of the HOE, respectively.
Figure 11B:
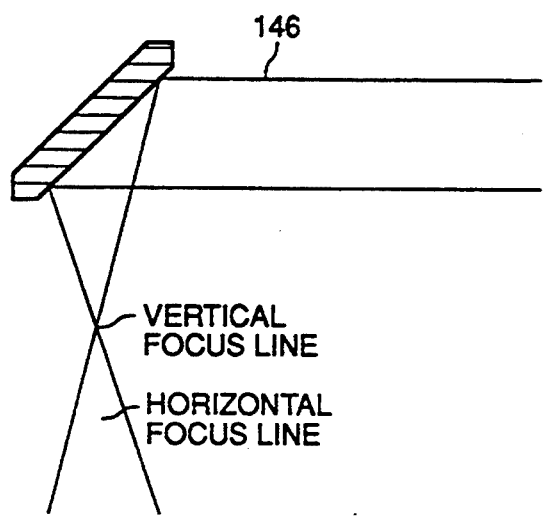

FIG. 11a illustrates a method and apparatus for generating a focus signal according to the astigmatic method, such as the method shown in Marchant (1990), incorporated herein by reference for all purposes. A parallel beam is focused at a horizontal line at one location 132 and a vertical line at another location 134 by an anamorphic lens 136 via beamsplitter 138. This astigmatic beam interferes with a collimated reference beam from beamsplitter 138, and mirrors 140 and 142 at the holographic plate 144. FIG. 11b shows the HOE in a "play back" mode in a CD player as it is used to generate horizontal and vertical focus lines from a collimated beam 146.

Figure 12:
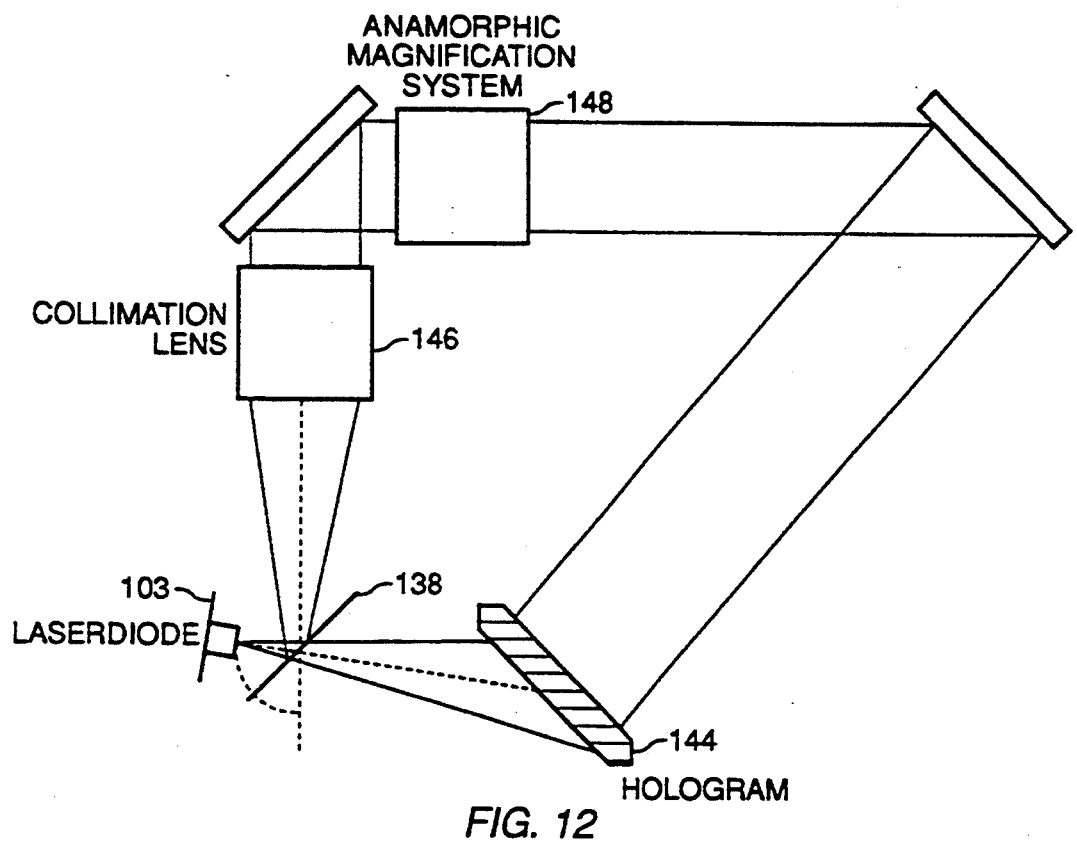
FIG. 12 illustrates apparatus for forming an HOE for correction of ASPECT ratio.

FIG. 12 illustrates a recording apparatus for HOE which corrects the aspect ratio of a laserdiode beam. The beam emitted by the laserdiode 103 is again split into two beams by beamsplitter 138. One beam goes on directly to the holographic plate 144. The other beam is collimated in a collimation lens 146. The beam then proceeds through an anamorphic magnification system 148, such as a model no. 066PA made by Melles Griot, or may be custom designed with the effect that the beam now has a circular cross-section. Incidence angles for both beams have to be selected carefully by the designer and are in general not equal. These angles are determined by the properties of laserdiode.

Figure 13:
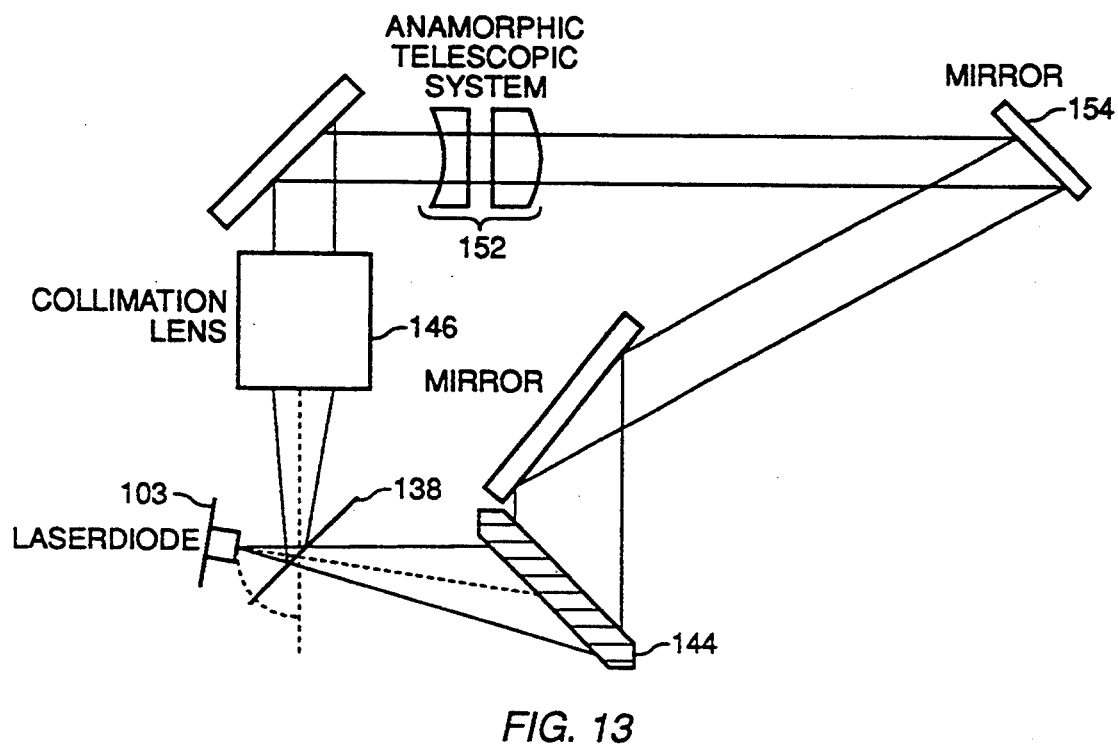
FIG. 13 illustrates apparatus for forming an HOE for collimation and correction of astigmatism in a laserdiode beam.

FIG. 13 illustrates a recording system for forming a volume hologram which will correct for astigmatism. Light from the laserdiode 103 is split with a beamsplitter 138. One portion of the light beam proceeds directly to the hologram 144. The other beam proceeds through a collimation lens 146 and is reflected by a mirror 150 to an anamorphic telescopic lens system. The beam is then reflected by mirrors 154 and 156 to interfere with the first beam on the hologram 144. The angles of approach of the beams to the HOE will depend on the wavelength of light used, the efficiency required, allowable amount of depolarization, and the like.

IV. Focus Technique

In optical recorders, the optical media must remain very close to the focal point of the write or read light source. Thus, focus control is an important concern in the design of optical recording systems. Typically, the beam focus should remain within 0.5 to 1.0 micrometers of the optical media surface. However, this tolerance is typically orders of magnitude smaller than the irregularities present in commercially available optical media. Thus, an efficient control system is necessary to keep the beam in focus. Tracking and focus systems are generally described in Marchant, "Optical Recording" Chapter 7 (1990), which is incorporated herein by reference for all purposes.

Typically this is accomplished with an actuator used in conjunction with servo electronics and appropriate optics to generate the error signal representing the amount and direction that the beam is out of focus. The present invention employs volume HOE elements in place of one or more of the traditional optical elements used in focus correction. The beam reflected from the surface of the media will pass through a volume HOE 11 which focuses the reflected beam. The focal point of the beam passing through the HOE is monitored by one or more light sensitive elements or photodetectors, preferably photodiodes. The output signal from photodetector(s) generates an error signal which permits focus control of the optics.

Figure 14A:
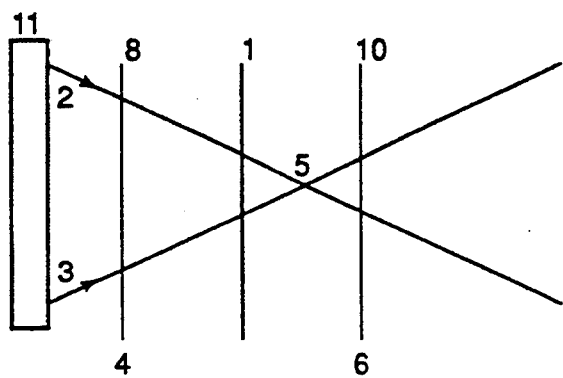
FIG. 14a, 14b, and 14c illustrate the principle of generating focus error signals.
Figure 14B:
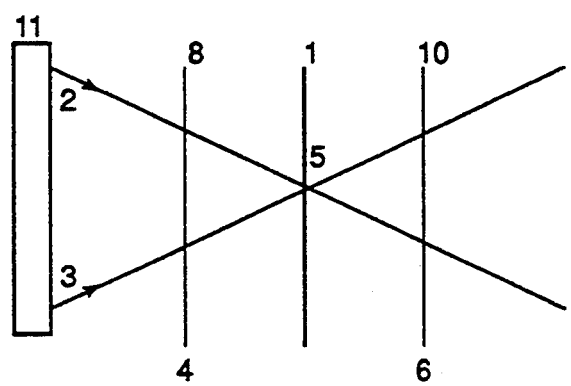
Figure 14C:
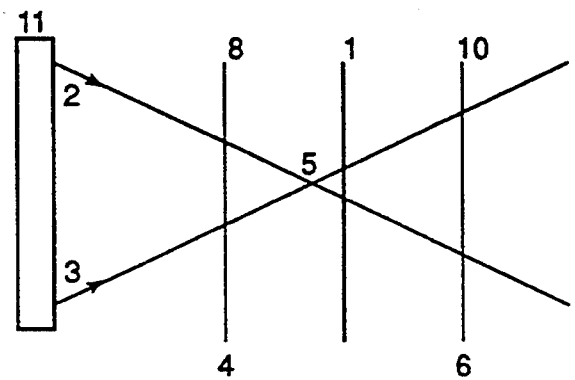

The error signal may be generated according to one or more embodiments of the present invention. In one embodiment, two photodiodes are employed. As shown in FIG. 14, the converging light rays 2 and 3 will be focused between two photodetectors located on planes 8 and 10. The focal point 5 should remain between these photodetectors at a constant position indicated by solid line 1. This corresponds to a value of zero error in focus. If the focus moves toward one of the photodetectors, the beam spot area will decrease on that photodetector and increase on the other photodetector. This is illustrated in FIGS. 14a and 14c where the positions of the two photodiodes are again represented by the dotted lines 8 and 10, and solid line 1 indicates the focus plane. Circles 4 and 6 indicate the relative size of the beam at the photodiode planes. As shown in FIG. 14b the beam spots 4 and 6 have equal areas when the laser beam is focused at one-half the distance between two photodetectors. In the embodiment shown in FIG. 14, the proper focal plane is at a position one-half the distance between the photo detectors. However, other embodiments are acceptable. For instance, the proper beam focal plane may be one-third of the distance between the two photodetectors. FIGS. 14a and 14c show how the beam sizes on the photodetectors change as the focal point moves away from the central position.

In one particular embodiment, the photodetectors are photodiodes that are smaller than the cross section of the beam. As the beam focus plane moves toward one photodiode, the total beam area decreases and more of the total light energy impinges on the photodiode. Thus a larger signal generated. In contrast, the signal decreases when the cross section gets larger. By subtracting one photodiode signal from the other, a focus error signal is generated.

Figure 15:
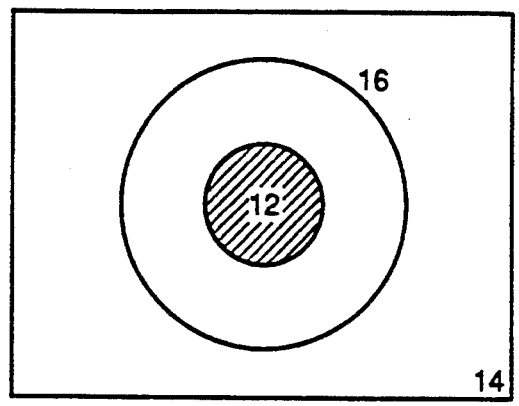
FIG. 15 illustrates a two-element photodiode used focus correction systems.

Because the photodiodes are smaller than the cross section of the beam, some of the energy from the laserdiode will be lost. FIG. 15 shows a more preferred embodiment that overcomes this problem. The photodiode used in this embodiment is made from a circular inner element 12 and a surrounding outer element 14. To capture all of the light energy, the outer element dimensions are significantly larger than the beam circumference 16. When the cross section of the beam 16 becomes smaller, the signal of the inner diode will increase while the signal of the outer diode will decrease. The opposite effect results when the beam cross section increases. Preferably, a two element photodiode is placed at each of the two planes 8 and 10 indicated in FIG. 14. By connecting the inner photodiode in one plane to the outer photodiode in the other plane, a focus error signal is derived which utilizes all of the available energy.

Figure 16:
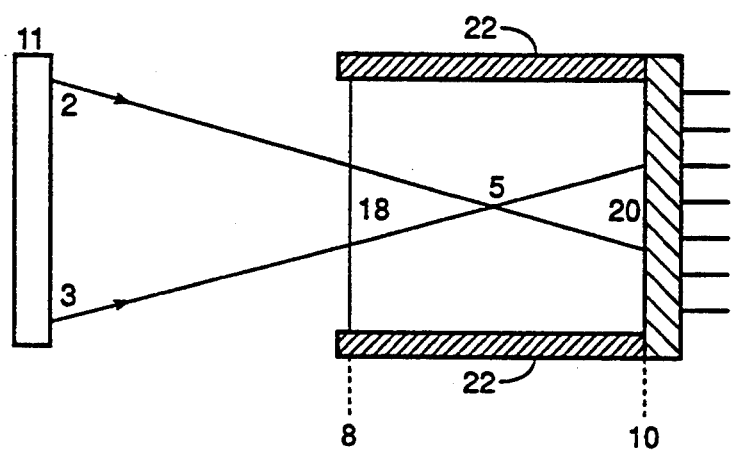
FIG. 16 illustrates apparatus for generating a focus error signal employing two photodiodes in the same housing.

An embodiment employing two photodiodes is shown in FIG. 16. There, the first photodetector 18 (the one closest to the optical media) is semi-transparent. A normal opaque photodiode 20 is used at the second position, further away from the optical media. Both photodiodes can be mounted in one cylindrical package having a housing 22. Light rays are focused to focal point 5 between photodiode planes 8 and 10. Preferably the semi-transparent photodiode absorbs approximately 50% of the energy while it transmits the other 50% to the second photodiode. The absorbed energy is converted to a photo signal at position 8 and the transmitted energy generates a signal at position 10. The system shown in FIG. 16 may employ single-element photodiodes as described above, or two-element photodiodes as described and shown in FIG. 15.

The previous embodiment fully realizes the advantages of this method. Because of the rotational symmetry of the photodiodes and the signal generation technique employed, this method is relatively insensitive to misalignments. Because of this same rotational symmetry, the method is also much less sensitive to cross talk caused by grooves present on the media. Often the optical media used for recording has an embedded track in which the data will be written (pre-grooved media). Due to optical aberrations and misalignments, most focus methods will suffer some cross talk between the tracking signals and focus signal. The proposed method performs considerably better than existing methods because of its built-in symmetry.

Figure 17:
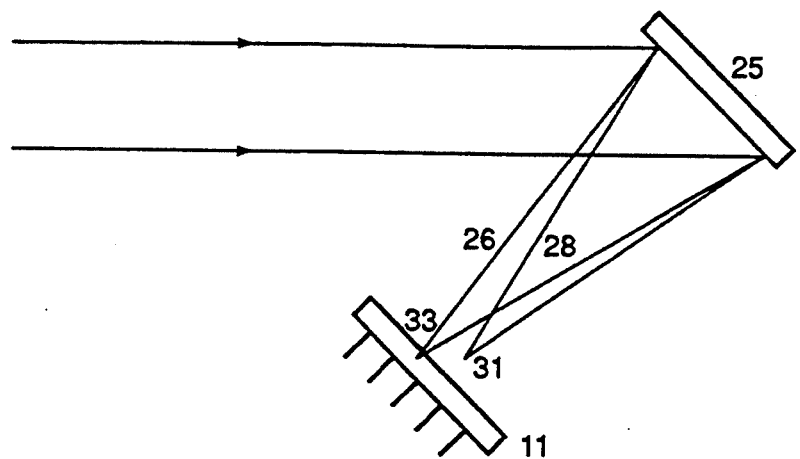
FIG. 17 illustrates a HOE which splits and focuses a light beam to be used in focus correction systems.

A different embodiment involves a volume HOE 25 that splits the reflected beam into two different focused secondary beams 26 and 28 as shown in FIG. 17. One of the secondary beams focuses in front of a photodetector plane 11 at position 31, while the other secondary beam focuses behind the same detector plane at position 33. This embodiment requires fewer parts and alignment steps than the previous embodiments. Thus only one photodetector is necessary.

V. Inverse Gaussian Filter

The light source in most optical recording systems is a laserdiode. Thus, the beam shape will be gaussian. Gaussian beams follow an intensity distribution given by the mathematical relationship $I=I_0[\exp(-x^2/r^22)]$, where Io is the maximum intensity, x is the distance from the beam centerline, and r is the beam radius at a point where the intensity is 1/e of its maximum. Thus, the beam intensity rapidly drops in an exponentially squared manner from its maximum at the beam centroid. In most optical recording systems, the intensity at the outer perimeter of the beam should preferably be equal to the intensity at the center of the beam, and not less than 0.3 times the center intensity. About 30% of the total beam energy in a typical gaussian laser beam lies beyond the perimeter where the intensity reaches 0.3 of the maximum. Thus, the efficiency is low. This reduces the amount of useful energy that can be collected from a laserdiode by as much as 40%.

One approach sometimes used to overcome this problem employs an inverse gaussian filter which attenuates the center intensity of a gaussian beam. As expected, these devices are very inefficient, typically having less than 5% efficiency.

Figure 18:
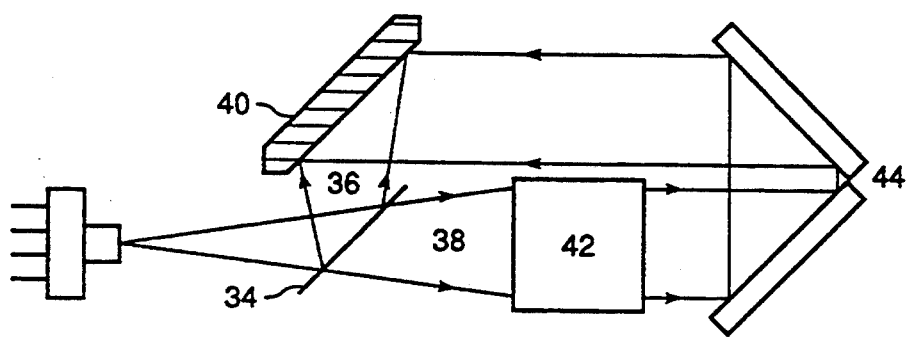
FIG. 18 illustrates apparatus for forming an HOE for inverting the gaussian profile intensity profile in a laserdiode beam.

According to the present invention, a holographic optical element is used to perform the beam shaping necessary to provide a more uniform intensity distribution across the beam spot. This approach has the advantages of high efficiency, simplicity, low cost, and ease of manufacture. FIG. 18 shows a typical arrangement used to generate an inverse gaussian beam-shaping volume HOE.

To produce such a volume HOE, the beam from a laserdiode must be split by a beam splitter into two secondary beams 36 and 38. Secondary beam 36 passes directly into one side of a previously undeveloped HOE 40. The other seconday beam 38 passes through shaping optics 42 which reshape the gaussian distribution, yielding a more uniform beam. This reshaped beam is then reflected by mirrors 44 onto the back side of the undeveloped HOE 40. The optical system 42 must be very precise. The finished HOE will be limited by the quality of these optics.

It is to be understood that the above description is intended to be illustrative and not restrictive. Many variations of the invention will become apparent to those of skill in the art upon review of this disclosure. Merely by way of example, the description herein is made primarily with reference to one or two beams used in reading data from an optical disc, but the invention is not so limited and could be used with a greater number of beams or with beams of different wavelengths such as would be required in many erasable compact disc applications. For example, the HOEs described herein could be utilized to control not only a read beam, but also a write beam, and an erase beam in an erasable optical data storage system. By way of further example, the invention herein could be used in conjunction with optical storage media used in data storage applications, video storage applications or the like. The scope of the invention should, therefore, be determined not with reference to the above description, but instead should be determined with reference to the appended claims along with their full scope of equivalents.

What is claimed is:

1. Apparatus for controlling at least one beam of light in an optical data storage system comprising:
   a) a light source; and
   b) a multi-function volume holographic optical element (HOE) in a raypath of light from said light source, said holographic optical element adapted to perform a plurality of optical functions selected from the group of generating servo error signals, generating a focus error signal, generating a tracking error signal, collimation, beam shaping, beam splitting, and combining at least two beams.

2. Apparatus as recited in claim 1 wherein said light source is a laser.

3. Apparatus as recited in claim 1 wherein said light source is a laserdiode.

4. Apparatus as recited in claim 1 further comprising a light detection element for receiving light reflected from said optical data storage media.

5. Apparatus as recited in claim 4 wherein said light source and said light detection element are in a common housing.

6. Apparatus as recited in claim 5 wherein said light source is a laserdiode and said light detection element is a photodiode.

7. Apparatus as recited in claim 1 wherein said light source comprises first and second light sources.

8. Apparatus as recited in claim 7 wherein said first and said second light sources are laserdiodes.

9. Apparatus as recited in claim 1 further comprising a means for detecting light reflected from said optical data storage media, said optical data storage media modulating said reflected light.

10. Apparatus as recited in claim 1 wherein said light source is a write wavelength light source, said write wavelength causing said optical media to expand in response thereto to form an optically detectable data bump.

11. Apparatus as recited in claim 1 wherein said light source produces the light having a gaussian intensity distribution.

12. Apparatus as recited in claim 11 wherein said holographic optical element shapes and collimates said light from said light source.

13. Apparatus as recited in claim 12 wherein said holographic optical element shapes said light from said light source by making said gaussian intensity profile more uniform.

14. The apparatus of claim 1 further comprising means for generating relative motion between an optical data storage media positioned in said raypath and said volume HOE so as to derive digital data from said optical data storage media.

15. The apparatus of claim 14 wherein said generating means comprises means for rotating said optical data storage media in said raypath.

16. An optical, digital data system comprising:
   a) a divergent light source;
   b) a light sensitive element; and
   a multi-function volume holographic element (HOE), said volume HOE positional in a lightpath of said light source, so as to focus light from said light source on an optical data storage medium and to focus light reflected from said optical data storage medium on said light detection element.

17. An optical digital data system comprising:
a) first and second divergent light sources;
b) a multi-function volume holographic optical element (HOE), said volume HOE positioned in a lightpath between said first and second light sources, and an optical data storage media to;
   i) combine beams from said first and second divergent light sources; and
   ii) collimate light from said first and second light sources.

18. The optical digital data system as recited in claim 17 wherein said HOE also splits returned beam from said optical data storage medium.

19. The optical digital data storage system as cited in claim 17 wherein said HOE also generates a servo error signal for said system.

* * * * *